(12) United States Patent
Rautenbach (10) Patent No.: US 7,150,457 B2
(45) Date of Patent: Dec. 19, 2006

(54) SUSPENSION SYSTEM FOR A VEHICLE

(75) Inventor: Marthinus Wessel Rautenbach, Parys (ZA)

(73) Assignee: Jakob Johannes Van Der Westhuizen, Parys (ZA)

( * ) Notice: Subject to any disclaimer, the term of this patent is extended or adjusted under 35 U.S.C. 154(b) by 0 days.

(21) Appl. No.: 10/516,223

(22) PCT Filed: Jun. 4, 2003

(86) PCT No.: PCT/ZA03/00073

§ 371 (c)(1),
(2), (4) Date: May 23, 2005

(87) PCT Pub. No.: WO03/103996

PCT Pub. Date: Dec. 18, 2003

(65) Prior Publication Data

US 2005/0212247 A1    Sep. 29, 2005

(30) Foreign Application Priority Data

Jun. 4, 2002   (ZA) .................................. 02/4447

(51) Int. Cl.
B60G 17/04 (2006.01)
(52) U.S. Cl. .............................. 280/5.507; 280/124.161
(58) Field of Classification Search ............. 280/5.514, 280/5.5, 5.502, 5.504, 5.506, 5.507, 5.512, 280/5.515, 5.519, 6.157, 124.157, 124.158, 280/124.16

See application file for complete search history.

(56) References Cited

U.S. PATENT DOCUMENTS

| | | | | |
|---|---|---|---|---|
| 2,184,202 A | * | 12/1939 | Tschanz | 280/5.506 |
| 3,917,295 A | * | 11/1975 | Hiruma | 280/5.507 |
| 3,917,307 A | * | 11/1975 | Shoebridge | 280/104 |
| 4,270,771 A | * | 6/1981 | Fujii | 280/5.514 |
| 5,794,966 A | * | 8/1998 | MacLeod | 280/5.507 |
| 5,919,240 A | * | 7/1999 | Ney et al. | 701/37 |
| 6,604,034 B1 | * | 8/2003 | Speck et al. | 701/37 |
| 6,669,216 B1 | * | 12/2003 | Elser et al. | 280/124.106 |
| 6,834,865 B1 | * | 12/2004 | Lin | 280/5.507 |
| 2002/0074758 A1 | * | 6/2002 | Frey | 280/124.16 |
| 2003/0015846 A1 | * | 1/2003 | Rogala et al. | 280/5.514 |
| 2004/0090019 A1 | * | 5/2004 | Germain | 280/5.502 |

FOREIGN PATENT DOCUMENTS

| | | |
|---|---|---|
| DE | 1 112 907 | 8/1961 |
| DE | 1 947 232 | 4/1971 |
| DE | 44 06 650 | 9/1995 |
| DE | 198 53 873 | 5/2000 |
| FR | 1.256.864 | 3/1961 |

* cited by examiner

Primary Examiner—Paul N. Dickson
Assistant Examiner—Barry Gooden, Jr.
(74) Attorney, Agent, or Firm—Merchant & Gould P.C.

(57) ABSTRACT

A suspension system for a vehicle for use on any terrain. The suspension system (70) includes a plurality of fluid-operated cylinders (6, 7, 8, 9) which are each configured to interconnect wheels (1, 2, 3, 4) of the vehicle to the chassis (5). Fluid flow communication between the fluid-operated cylinders (6, 7, 8, 9) is achieved via tubes (15, 16, 17, 19) which extend between operative upper or lower chambers of fluid-operated cylinders (6, 7, 8, 9).

7 Claims, 9 Drawing Sheets

SUSPENSION SYSTEM FOR A VEHICLE

FIELD OF THE INVENTION

This invention relates to a suspension system for a vehicle having at least, but not limited to, two pairs of wheels.

BACKGROUND TO THE INVENTION

The aim of any suspension system is to provide a vehicle with a suspension that simultaneously resists dive, squat and roll, provides a comfortable ride with extensive axle articulation whilst maintaining equal pressure on all wheels as far as possible.

Conventional suspension systems cannot offer all of the above requirements and have to compromise on ride quality which in turn is associated with spring stiffness. Springs that are too stiff springs provide a harsh ride and impede axle articulation. Soft springs provide a softer ride but cause unwanted effects on the handling of the vehicle, such as too much dive, squat and body roll.

Another disadvantage of conventional suspension systems is the building up of kinetic energy as the springs on the wheels compress and the subsequent release of this energy when the springs return to their original state. This causes chassis twist and wheel bounce which requires dampening by hydraulic dampers.

The inventor therefore believes, that a need exists for a suspension system that provides extensive wheel articulation independent of axle articulation, near equal pressure on all the wheels, no body roll, minimal dive and squat and a comfortable ride on all types of surfaces due to the prevention of a build up of kinetic energy and the absence of chassis twist.

SUMMARY OF THE INVENTION

According to the invention there is provided a suspension system for a vehicle including:

- a plurality of fluid-operated cylinders which are each configured to interconnect the wheels of the vehicle to a chassis and which cylinders are connected in flow communication with one another via a first flow communication means so that displacement of one of the wheels, and with it a piston of the fluid-operated cylinder connected to said one wheel, in a substantially vertical plane will cause a corresponding but opposite displacement of pistons of the fluid-operated cylinders that are directly in flow communication with the cylinder connected to said one wheel, thereby to urge their associated wheels into contact with the surface over which the vehicle is traveling and so that the volume of fluid in opposing cylinders and the flow communication means connecting them is always equal; and
- one or more fluid-operated flow control arrangements configured to connect fluid-operated cylinders of opposing wheels via a second flow communication means for improving contact between the wheels and said surface and to provide damping without affecting other opposing sets of wheels whilst maintaining equal volumes of fluid in opposing cylinders and the flow communication means connecting them.

Each fluid-operated cylinder may include an upper and a lower chamber, the chambers being separated by a piston associated with that cylinder.

The fluid in the fluid-operated cylinders may be a liquid or a gas. The cylinders may be hydraulic cylinders.

In operation, when the pressure in the upper chambers of the cylinders is greater than the pressure in the flow control arrangement, feedback circuits of the flow control arrangement will urge further fluid in equal measure into the lower chambers of opposing cylinder associated with opposing wheels to speed up displacement of the wheels in contact with the surface thereby to aid damping thereof.

The flow control arrangement may include means for regulating the volume of fluid in each of the fluid-operated cylinders and flow communication means so that the fluid volume in the left cylinders and their connecting flow communication means remains substantially equal to the volume of fluid in the right cylinders and their connecting flow communication means.

The system may further include height adjustment means associated with the flow control arrangement in flow communication with the fluid-operated cylinders to facilitate adjustment of the height of the chassis relative to the wheels.

The height adjustment means may be connected to any suitable pressurizing means, typically any suitable conventional pump means. A height adjustment means may be arranged on the front set of wheels and/or the rear set of wheels and/or on both. The height adjustment means on the front and rear sets of wheels respectively may be arranged in communication with each other.

Further scope of applicability of the present invention will become apparent from the detailed description given hereafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of example with reference to the accompanying drawings.

In the drawings.

Figure 1:
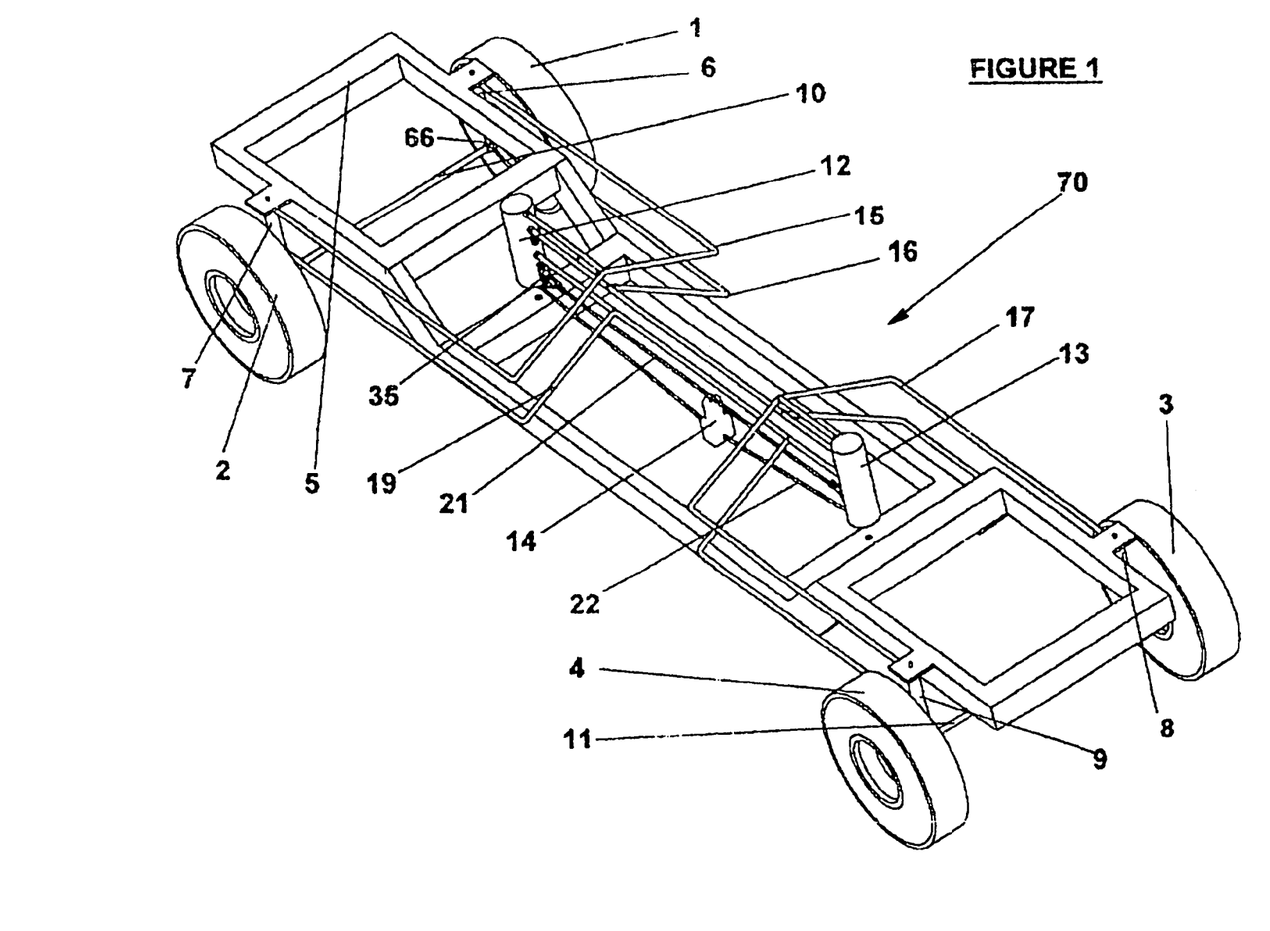
FIGS. 1 and 2 show a preferred embodiment of a suspension system for a vehicle in accordance with the invention in differing perspective views.
Figure 2:
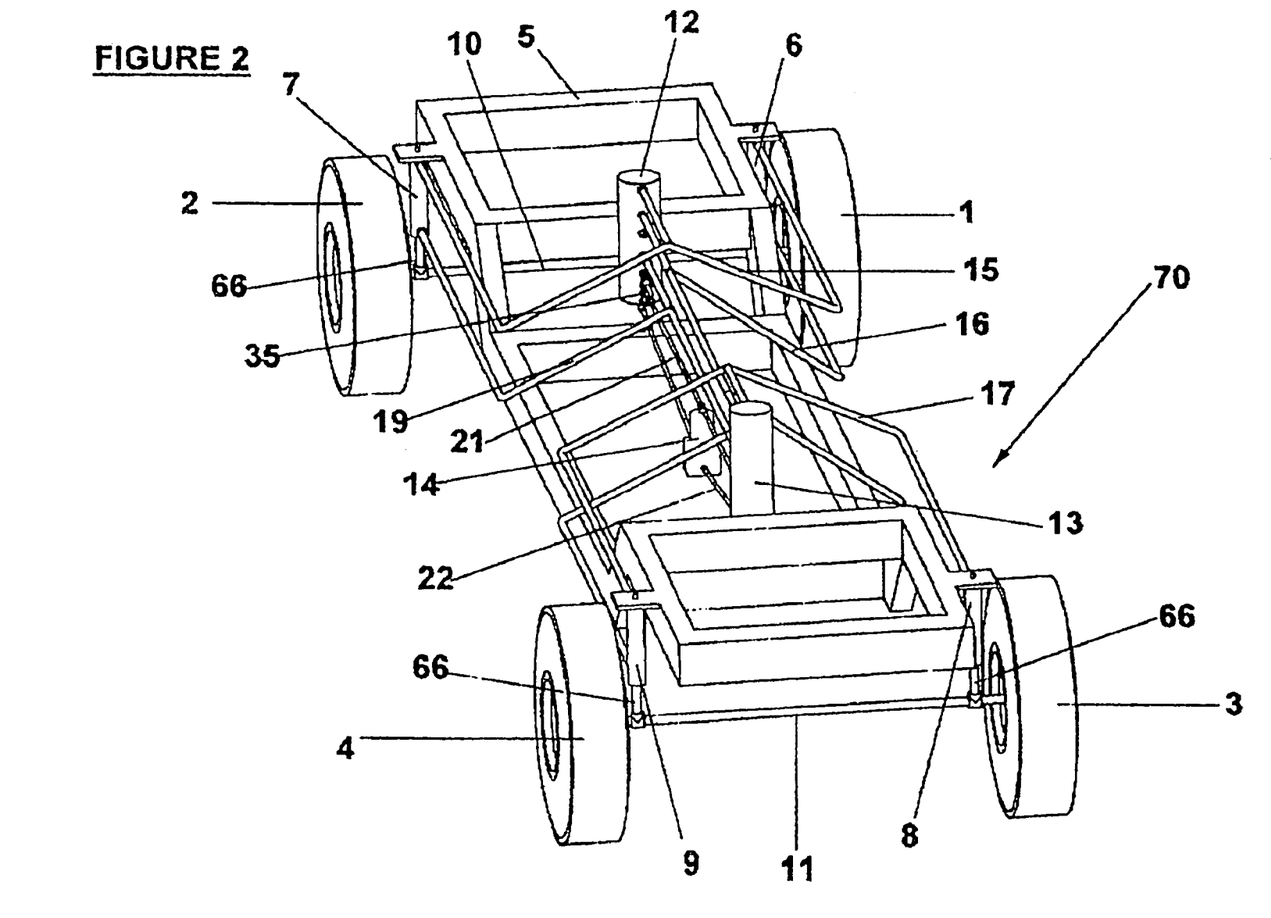

Referring now to FIGS. 1 and 2, reference numeral 70 generally designates a suspension system for a vehicle for use on any terrain. The suspension system 70 includes a plurality of hydraulic cylinders 6, 7, 8 and 9 which are each configured to interconnect wheels 1, 2, 3 and 4 of the vehicle to the chassis 5.

Fluid flow communication between the hydraulic cylinders 6, 7, 8 and 9 is achieved via tubes 15, 16, 17 and 19 which extend between operative upper or lower chambers of hydraulic cylinders 6, 7, 8 and 9.

Pneumatically pressurized flow control arrangements 12 and 13 are arranged between and in flow communication with opposing front wheels 1 and 2 and opposing wheels 3 and 4 for improving contact between the wheels 1, 2, 3 and 4 and a surface when the vehicle is traveling rapidly over uneven, rugged terrain. Tubes 15, 16, 17 and 19 are provided to permit flow communication between upper and lower chambers of the hydraulic cylinders and the flow control arrangements 12 and 13.

Figure 3:
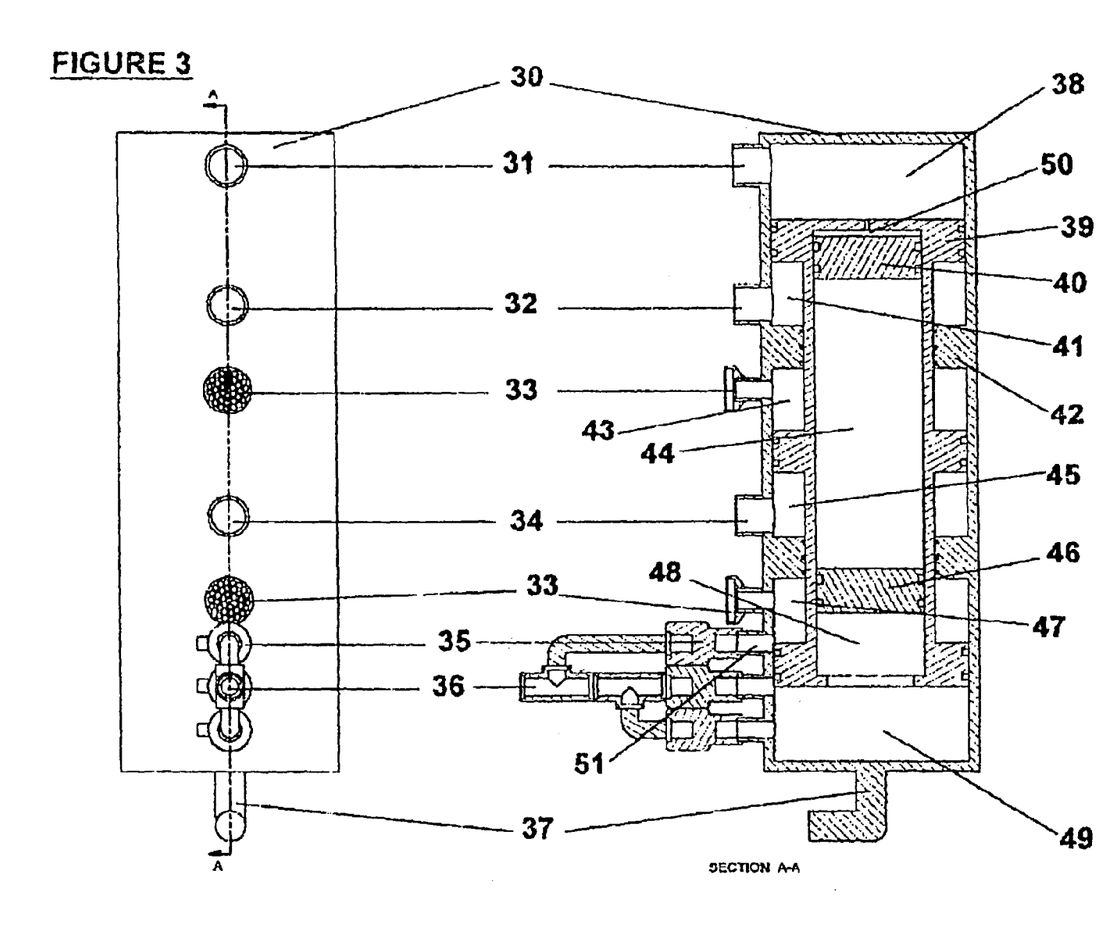
FIG. 3 shows a preferred embodiment of a flow control means in a top view and in a sectioned view along line A—A.

Referring now to FIG. 3, reference numeral 30 generally indicates a flow control arrangement for regulating and equalizing the fluid volumes in hydraulic cylinders 6, 7, 8 and 9 (FIG. 1) and the tubes 15, 16, 17 and 19 (FIG. 1).

The flow control arrangement 30 comprises upper port 31 that provides access to damping chamber 38, middle port 32 that provides access to equalizing chamber 41, lower port 34 that provides access to equalizing chamber 45, inlet port 37 that provides access to damping and leveling chamber 49, outlet port 36 that is connected to leveling ports 51 via cutoff valves 35, damping expansion chamber 48 divided from pneumatically pressured chamber 44 by piston 46, fluid expansion chamber 50 and fluid expansion piston 40 including flange 39 for separating the fluids and breathers 33 that filter air moving in and out of chambers 43 and 47.

Figure 4:
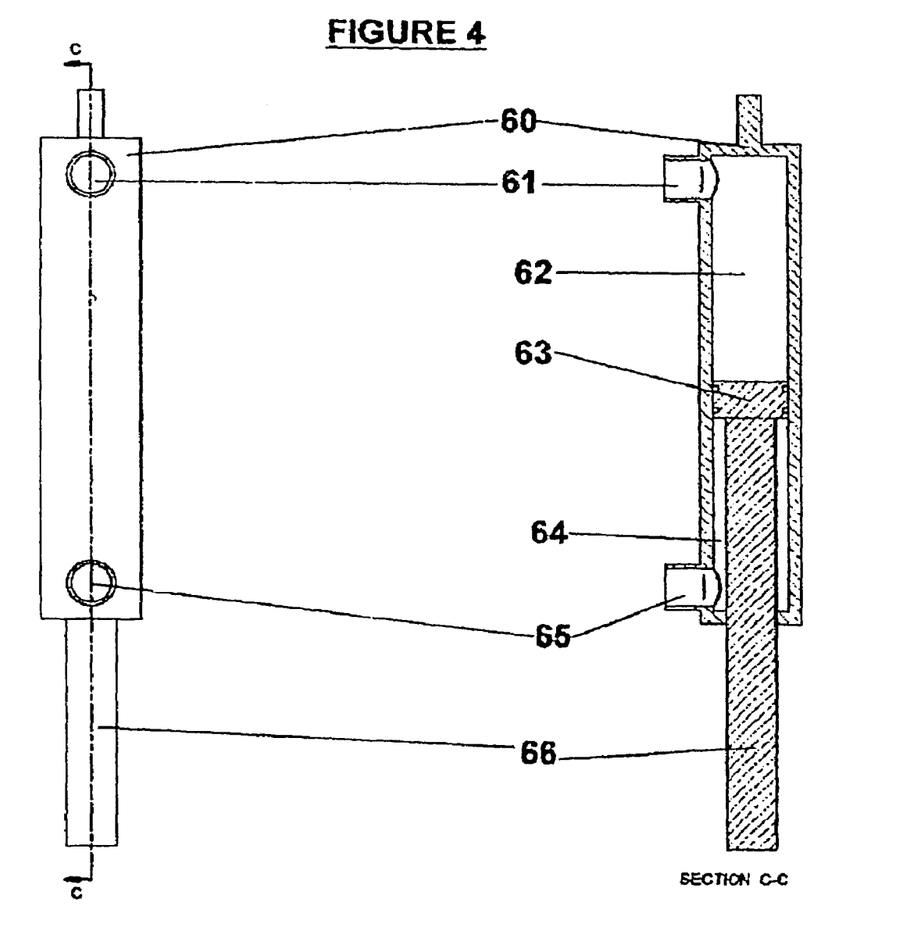
FIG. 4 shows a typical hydraulic cylinder.

Referring now to FIG. 4, reference numeral 60 generally designates a hydraulic cylinder that is configured to interconnect wheels 1, 2, 3 and 4 (FIG. 1) of the vehicle to the chassis 5 (FIG. 1) and is typically connected via an axle 10 or 11 (FIG. 1) to ram 66 of the hydraulic cylinder 60. The hydraulic cylinder 60 includes an upper chamber 62 and lower chamber 64 separated by a piston 63. The upper port 61 allows access to upper chamber 62 and the lower port 65 allows access to the lower chamber 64.

Figure 5:
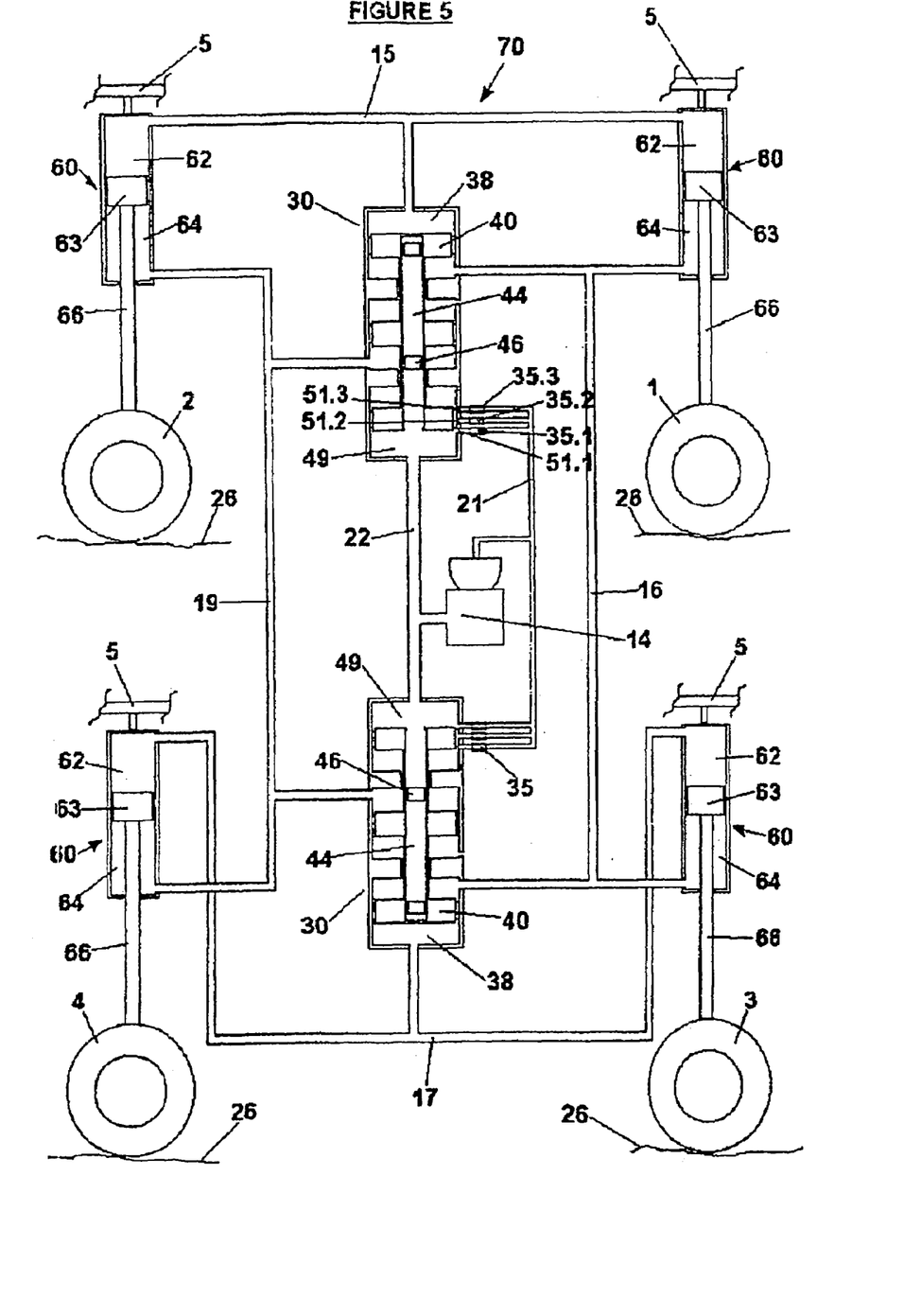
FIGS. 5, 6 and 7 show a schematic preferred embodiment of a suspension system in accordance with the invention in rest with height control, in normal operation and in operation traveling over a bump respectively.

Referring now to FIG. 5, reference numeral 70 generally indicates a suspension system for a vehicle for use on any terrain. The suspension system 70 includes a plurality of hydraulic cylinders 60 which are each configured to interconnect wheels 1, 2, 3 and 4 of the vehicle to the chassis 5.

Fluid flow communication between the hydraulic cylinders 60 is achieved via tubes 15, 16, 17 and 19 which extend between operative upper chamber 62 or lower chamber 64 of hydraulic cylinders 60. The wheels 1, 2, 3 and 4 are typically connected via their axles 10 and 1 (FIG. 1) to rams 66 of the hydraulic cylinders 60.

A pneumatically pressurized flow control arrangement 30 is arranged between and in flow communication with opposing front wheels 1 and 2 and opposing rear wheels 3 and 4 to improve contact between the wheels 1, 2, 3 and 4 and a surface 26 when the vehicle is traveling rapidly over uneven, rugged terrain. Tubes 15, 16, 17 and 19 are provided to permit flow communication between upper chamber 62 and lower chamber 64 of the hydraulic cylinders and the flow control arrangement 30. A hydraulic pump 14 is connected in flow communication to flow control arrangement 30 via tube 21 and tube 22.

Hydraulic pump 14 provides fluid via tube 22 to damping and leveling chamber 49. The chamber 49 enlarges by forcing combined piston 40 towards damping chamber 38. When the combined piston 40 moves past leveling port 51.1 the fluid escapes via cutoff valve 35.1 through tube 21 back to the hydraulic pump 14. The combined piston 40 attempts to maintain this position until another cutoff valve 35 is opened and the current cutoff valve 35.1 is closed and then moves to that position.

Figure 6:
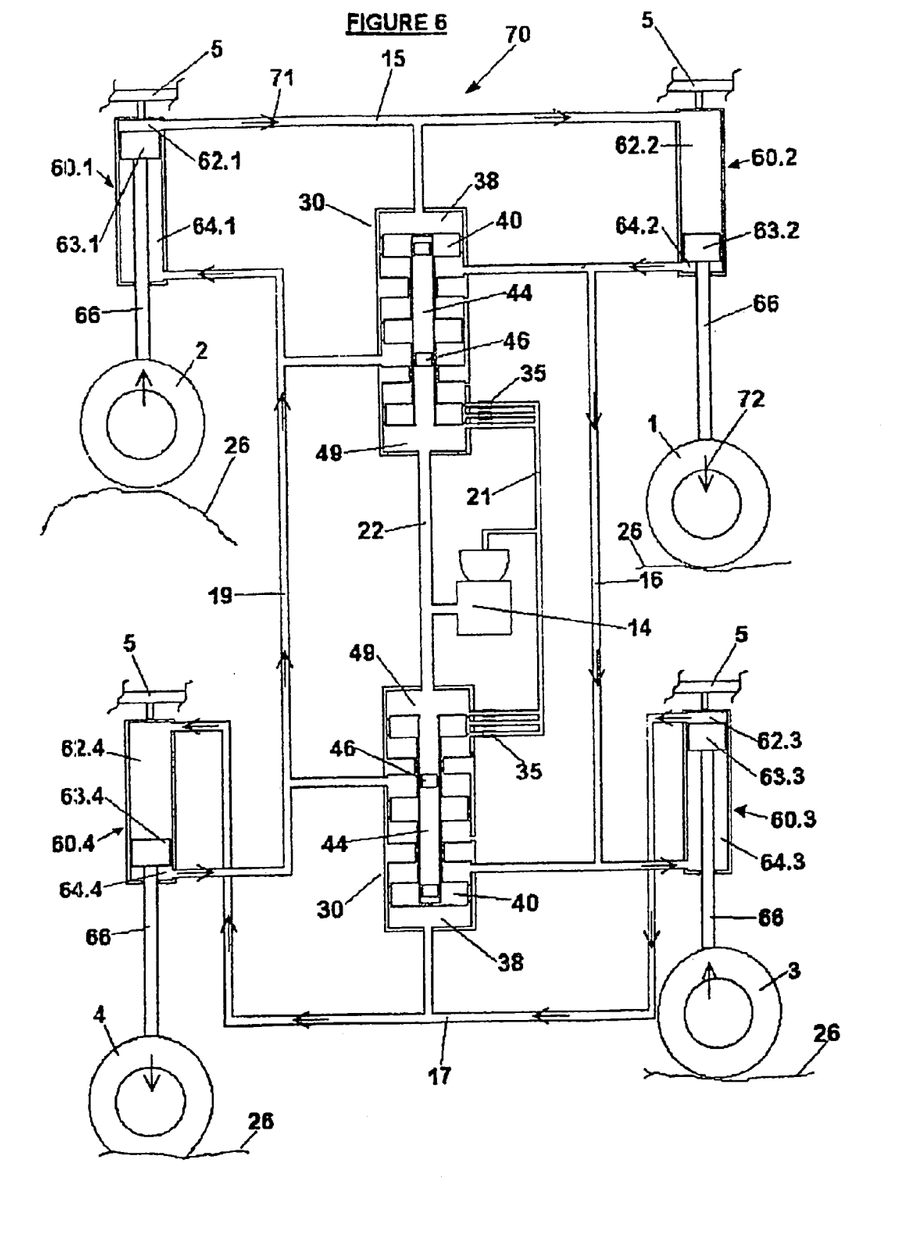

In operation, as is shown in FIG. 6, when wheel 2 passes over a raised portion of a surface 26, the piston 63.1 is urged upwardly which in turn causes fluid in said chamber 62.1 to move out of the upper chamber 62.1 thereof via tube 15 in the direction of arrow 71. Displacement of the fluid from the upper part of upper chamber 62.1 in turn causes the fluid to be introduced into the upper chamber 62.2 of hydraulic cylinder 60.2 which in turn urges the piston 63.2 downwardly in the direction of arrow 72 and with it the wheel 1 so as to maintain contact with the surface 26. Similarly, the displacement of the piston 63.2 causes fluid to move via tube 16 into the lower chamber 64.3 of hydraulic cylinder 60.3 which in turn causes piston 63.3, and with it wheel 3, to be displaced upwardly. Displacement of wheel 4 into contact with the surface 26 is achieved similarly by the passing of fluid between the upper chamber 62.3 of hydraulic cylinders 60.3 and upper chamber 62.4 of hydraulic cylinder 60.4 through displacement of their respective pistons 63.3 and 63.4.

Figure 7:
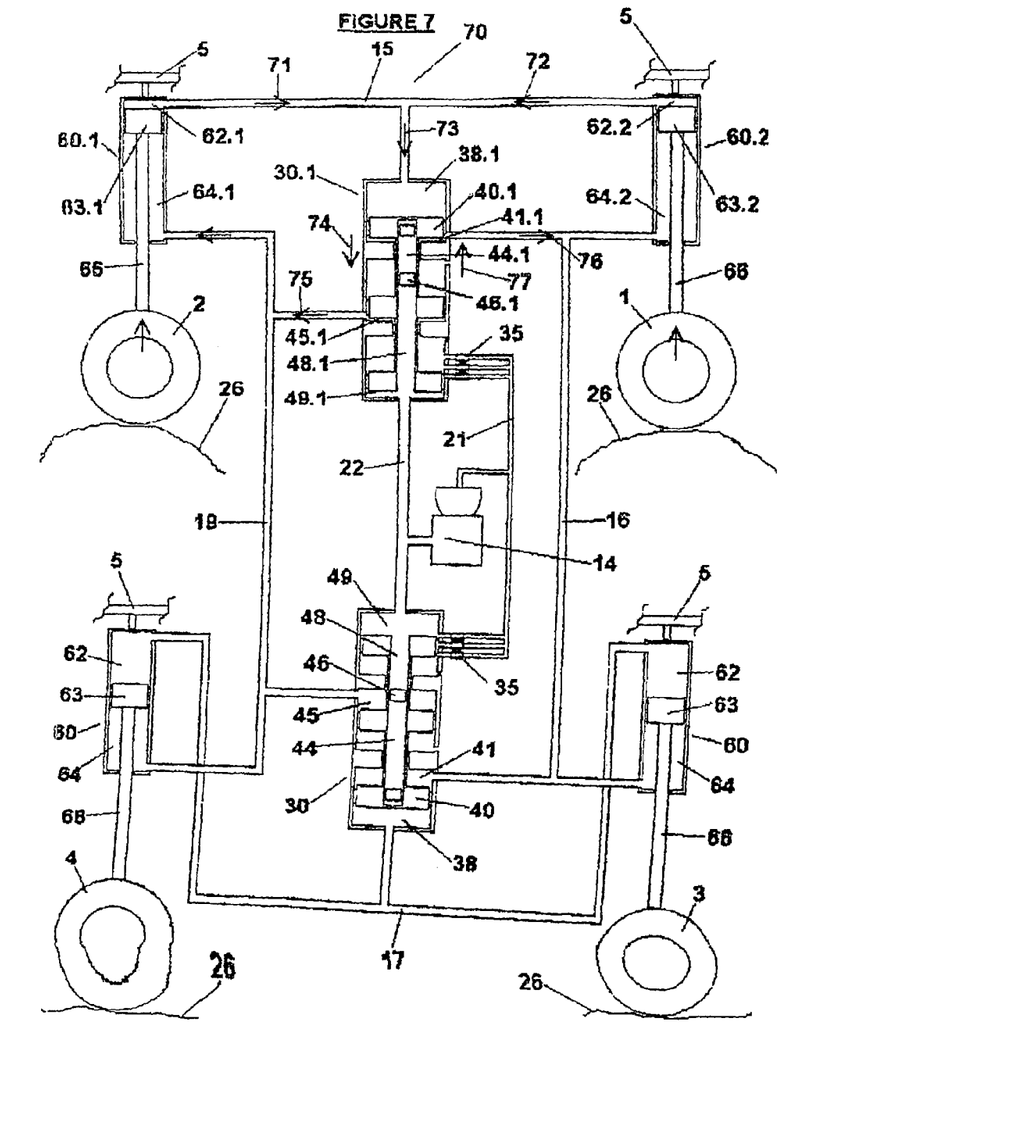

In operation as is shown in FIG. 7, when wheels 1 and 2 pass over a raised portion of a surface 26, and the pressure in upper chambers 62.1 and 62.2 are higher than the pressure in pneumatically charged chamber 44.1, the pistons 63.1 and 63.2 are urged upwardly which in turn causes fluid in the upper chambers 62.1 and 62.2 of hydraulic cylinders 60.1 and 60.2 to move via tube 15 in the direction of arrows 71, 72 and 73. Displacement of the fluid from the upper chamber 62.1 and 62.2 in turn causes the fluid to be introduced into the damping chamber 38.1 of flow control arrangement 30.1 which in turn urges the combined piston 40.1 downwardly in the direction of arrow 74. The fluid in damping chamber 49.1 cannot go anywhere and cause the piston 46.1 to move in direction of arrow 77 thereby compressing the gas in the pneumatically charged chamber 44.1. Displacement of the fluid from the combined piston 38.1 in turn causes the fluid in equalizing chamber 45.1 in the direction of arrow 75 into the lower chamber 64.1 of hydraulic cylinder 60.1. Displacement of the fluid from the combined piston 38.1 at the same time causes the fluid in equalizing chamber 41.1 in the direction of arrow 76 into the lower chamber 64.2 of hydraulic cylinder 60.2.

Figure 8:
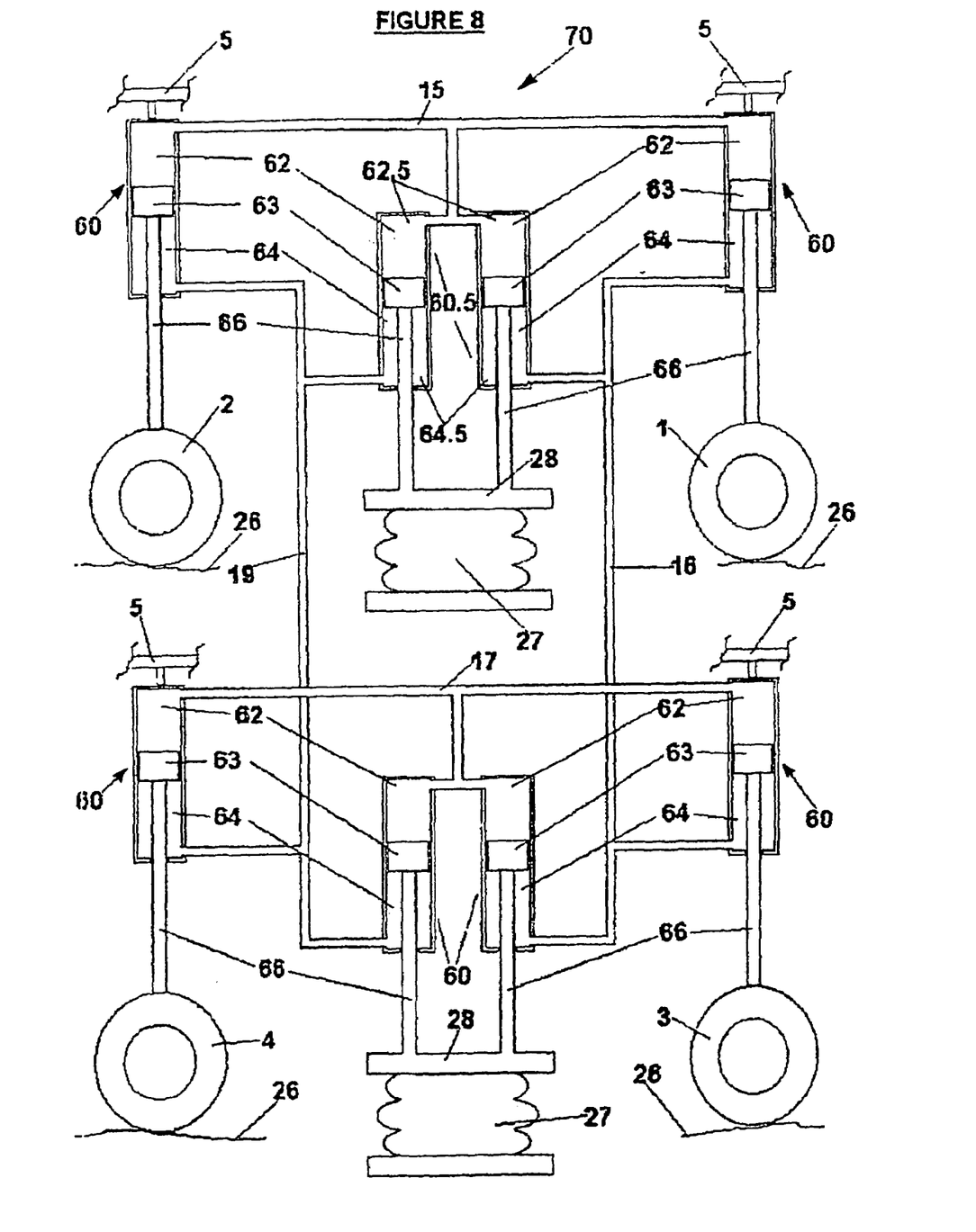
FIGS. 8 and 9 are schematic representations of a further embodiment of a suspension system in accordance with the invention.

Referring now to FIG. 8, the flow control arrangement 30 (FIG. 5) may be replaced by an airbag 27 which is connected to hydraulic cylinders 60.5 via a connecting bar 28. Alternatively, the airbag 27 may be replaced by any suitable biasing means such as for example a spring arrangement. The lower chambers 64.5 are connected to tubes 16 and 19 respectively. The upper chamber 62.5 is connected to tube 15.

Figure 9:
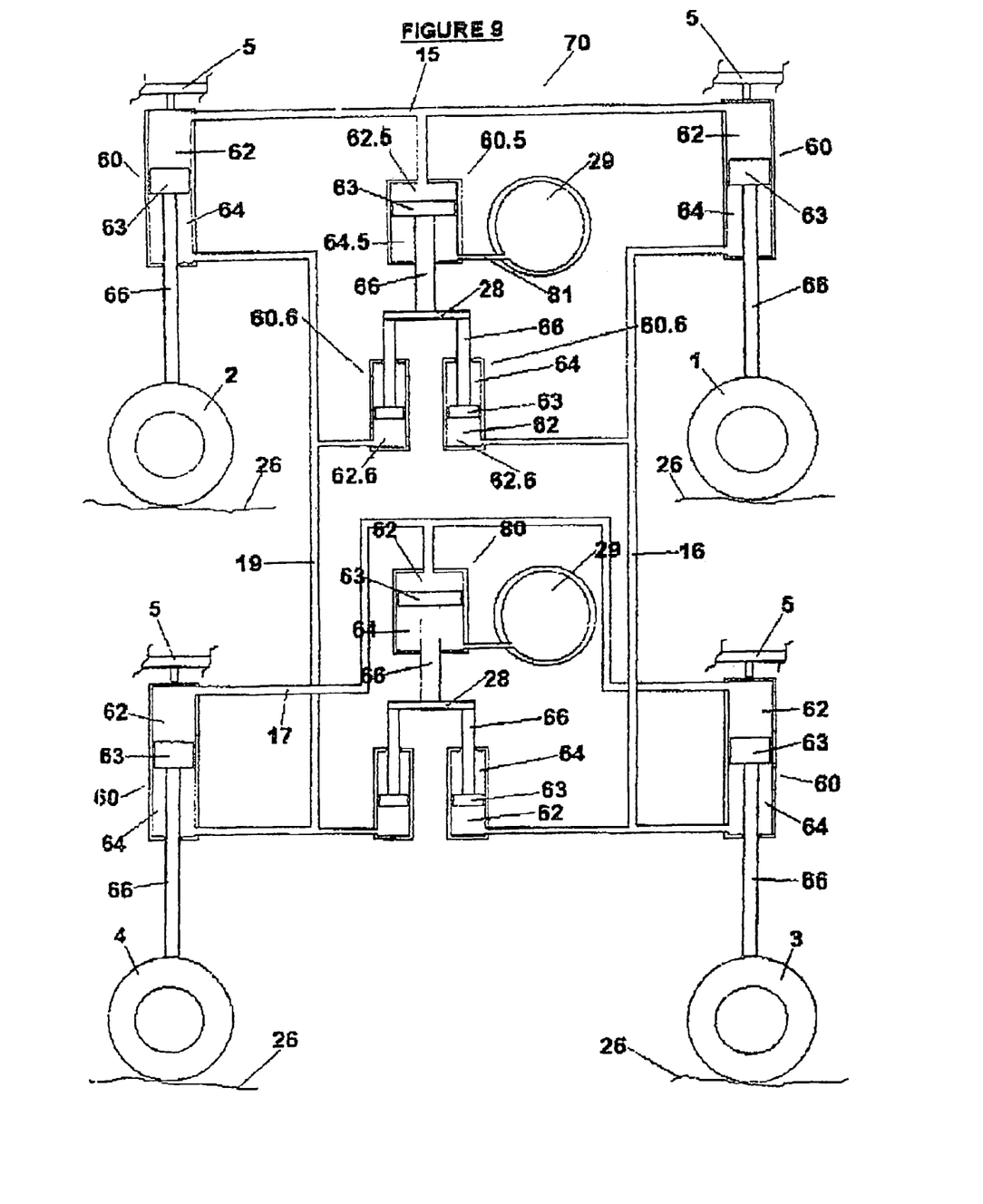

Referring now to FIG. 9 the flow control arrangement 30 (FIG. 5) may be replaced by a hydraulic cylinder 60.5 connected from lower chamber 64.5 to a pneumatically pressured vessel 29 via tube 81. Hydraulic cylinder 60.5 is connected to hydraulic cylinders 60.6 via a connecting bar 28. The upper chambers 62.6 are connected to tubes 16 and 19 respectively whilst the upper chambers 62.5 are connected to tube 15.

It is to be appreciated, that the invention is not limited to any specific embodiment or configuration as hereinbefore generally described or illustrated.

The invention claimed is:

1. A suspension system for a vehicle including:
   a plurality of fluid-operated cylinders which are each configured to interconnect the wheels of the vehicle to a chassis, each cylinder being divided into an upper and a lower chamber by a piston associated with that cylinder, the upper chambers of opposing left and right cylinders being directly connected in flow communication by a flow communication means and the lower chambers of longitudinally opposing or front and rear cylinders being directly connected in flow communication by a flow communication means so that displacement of one of the wheels, and with it a piston of the fluid-operated cylinder connected to said one wheel, in a substantially vertical plane will cause a corresponding but opposite displacement of pistons of the fluid-operated cylinders that are directly in flow communication with the cylinder connected to said one wheel, thereby to urge their associated wheels into contact with the surface over which the vehicle is traveling and so that the volume of fluid in opposing cylinders and the flow communication means connecting them is always equal; and one or more fluid-operated flow control arrangements configured to connect fluid-operated cylinders of opposing left and right wheels via a second flow communication means for improving contact between the wheels and said surface and to provide damping without affecting other opposing sets of left and right wheels whilst maintaining equal volumes of fluid in opposing cylinders and the flow communication means connecting them and wherein the flow communication means associated with the flow control arrangements and the flow communications means associated with the cylinders are interconnected but operate independently from each other.

2. A suspension system as claimed in claim 1 wherein, when the pressure in the upper chambers of opposing or left and right fluid-operated cylinders is greater than the pressure in the associated flow control arrangement, feedback circuits of the flow control arrangement will urge further fluid in equal measure into the lower chambers of said opposing fluid-operated cylinders associated with opposing wheels to speed up displacement of the wheels in contact with the surface thereby to aid damping thereof.

3. A suspension system as claimed in claim 1, wherein the flow control arrangement includes means for regulating the volume of fluid in each of the fluid-operated cylinders and flow communication means so that the fluid volume in the left fluid-operated cylinders and their connecting flow communication means remains substantially equal to the volume of fluid in the right fluid-operated cylinders and their connecting flow communication means.

4. A suspension system as claimed in claim 1, wherein the system further includes height adjustment means associated with the flow control arrangement in flow communication with the fluid-operated cylinders to facilitate adjustment of the height of the chassis relative to the wheels.

5. A suspension system as claimed in claim 4 wherein the height adjustment means is connected to any suitable pressurizing means.

6. A suspension system as claimed in claim 5 wherein the height adjustment means is arranged on a front set of wheels and/or a rear set of wheels and/or both.

7. A suspension system as claimed in claim 6 wherein the height adjustment means on the front and rear sets of wheels respectively are arranged in flow communication with each other.

* * * * *